Oct. 31, 1967    L. N. SCHUMAN    3,350,142
ACTUATOR SYSTEM
Filed Feb. 8, 1965    2 Sheets-Sheet 1
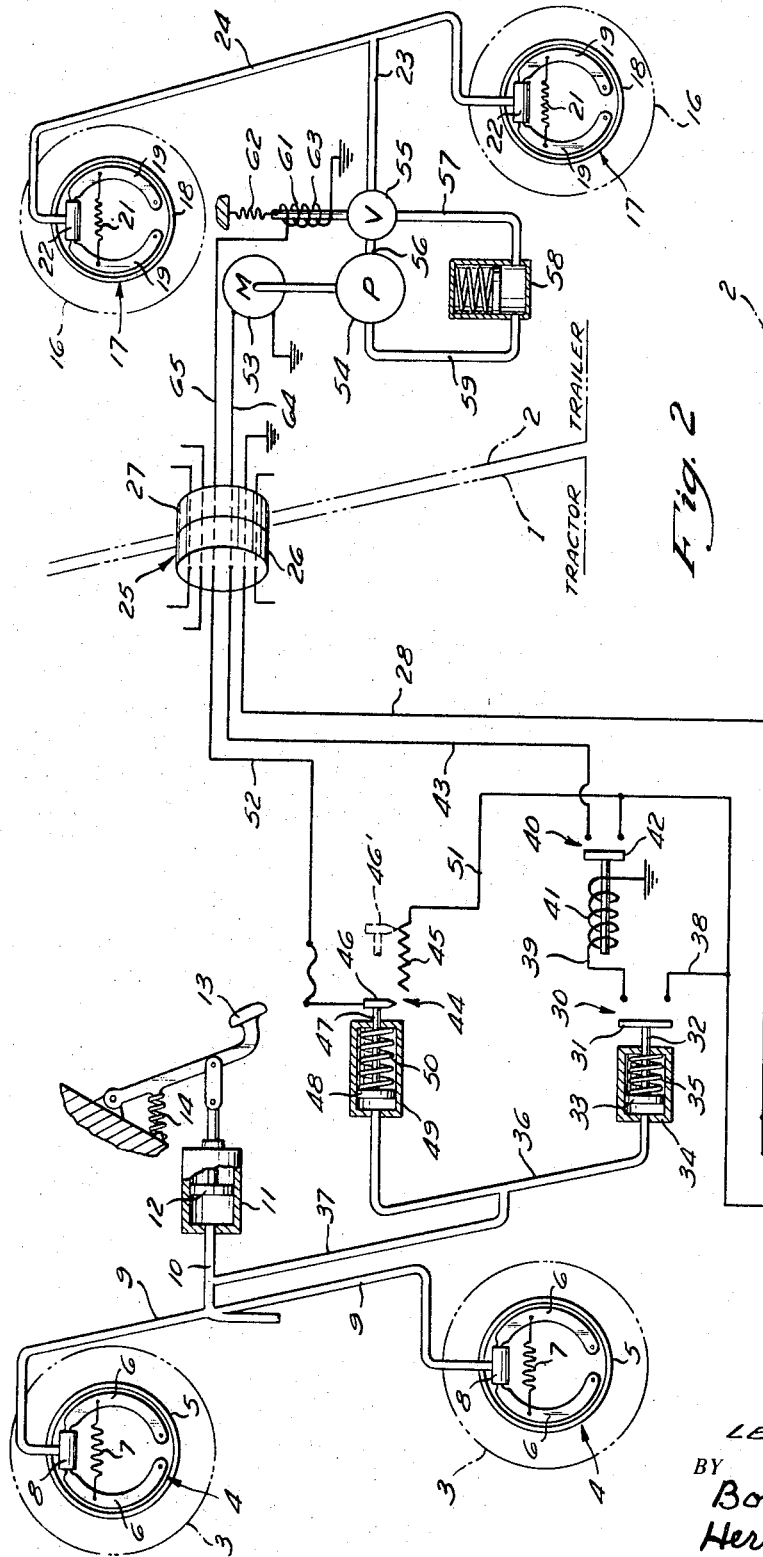
INVENTOR.
LESLIE N. SCHUMAN
BY
Bosworth, Sessions,
Herrstrom & Knowles
ATTORNEYS Oct. 31, 1967 — L. N. SCHUMAN — 3,350,142
ACTUATOR SYSTEM
Filed Feb. 8, 1965 — 2 Sheets-Sheet 2

INVENTOR.
LESLIE N. SCHUMAN
BY Bosworth, Sessions, Herrstrom & Knowles
ATTORNEYS United States Patent Office 3,350,142
Patented Oct. 31, 1967

3,350,142
ACTUATOR SYSTEM
Leslie N. Schuman, Loudonville, Ohio, assignor, by mesne assignments, to Midland-Ross Corporation, Cleveland, Ohio, a corporation of Ohio
Filed Feb. 8, 1965, Ser. No. 431,001
16 Claims. (Cl. 303—7)

ABSTRACT OF THE DISCLOSURE

An actuator system for effecting by fluid pressure operation of one or more actuatable elements such as the brake cylinders of a motor vehicle trailer, in which fluid pressure is applied to the element only after a sufficient time has elapsed to permit a motor driving a pump to develop sufficient power to develop the pressure suitable for operating the element.

Figure 3:
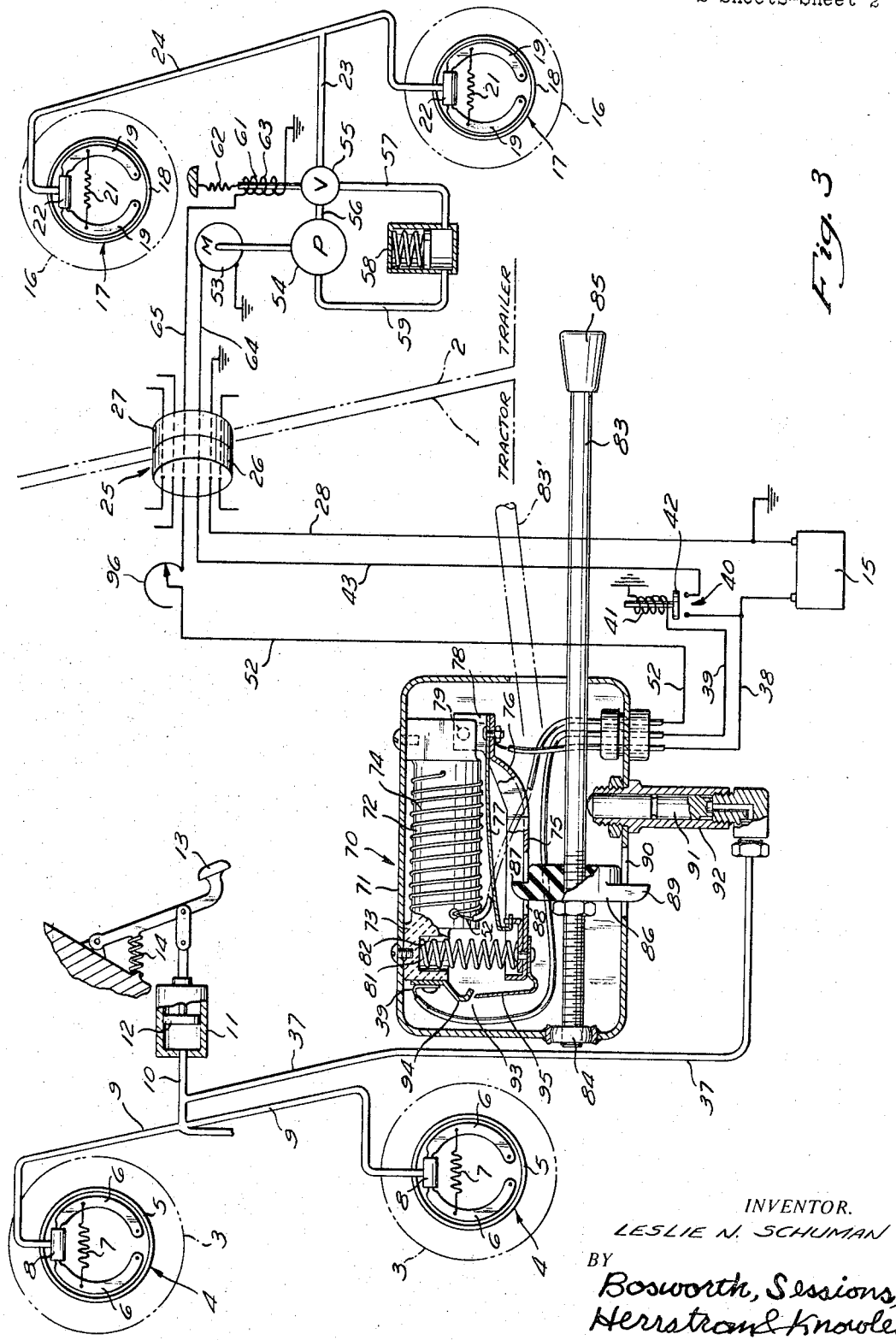

This invention relates to actuator systems, and more particularly to braking systems in which the brakes of trailers are remotely controlled from tractors.

For convenience, the invention will be described in connection with braking systems for house trailers that are towed by automobiles, in which use it provides exceptional advantages, although the invention may be employed in connection with boat trailers or other types of trailers or even in other environments.

House trailers are often provided with electrically operated brakes that are controlled by a rheostat operated from the tractor. However, such electric brakes are comparatively expensive and often do not provide the braking force necessary to achieve effective braking, as under emergency conditions.

While hydraulic brakes can generate the desired braking forces even for emergency purposes, it has been recognized that it is unfeasible to utilize on a house trailer a hydraulic braking system that is hydraulically coupled to the hydraulic braking system of the towing automobile and is operated by actuation of the automobile hydraulic braking system. This is because of the added volume of hydraulic fluid required, because the added load imposed on the automobile braking system could result in inadequate braking forces in the automobile and the trailer, and because coupling introduces the possibility of leakage that could cause failure of the braking system of either or both vehicles, with consequent danger.

It has been proposed to utilize on trailers hydraulic braking systems that are self-contained in the trailer and are controlled by various means from the tractor. However, in general, prior systems of this type have been excessively expensive and space-consuming for house trailer applications, and often not as dependable as desired.

The invention, in its broader aspects, comprises fluid-actuated means such as vehicle brakes, a motor-driven fluid pressure generator such as a pump, pressure-regulating means such as a modulator valve to control the pressure that is generated by the pressure generator and exerted on the fluid-actuated means, means for controlling the pump motor, and time-delay means to control the pressure-regulating means to permit fluid pressure to be applied to the fluid-actuated means only after a sufficient time has elapsed after the motor has started to permit the motor to develop adequate torque for supplying adequate fluid pressure to the fluid-actuated means. Preferably, when the invention is employed in a tractor-trailer braking system, the means controlling the motor may be actuated manually, or may be actuated upon initial application of pressure to the brake pedal of the tractor; it is also desirable that such means be capable of being actuated either manually or upon activation of the brake pedal. Moreover, the pressure regulating means is preferably controlled so that the force exerted on the trailer brakes from fluid pressure increases with, and desirably is substantially proportional to, the brake pedal pressure exerted on the tractor's braking system. In a still other and preferable aspect, the braking system of the trailer may be arranged with respect to the braking system of the tractor so that the brakes on the trailer operate before the brakes on the tractor, and with greater braking action, to reduce possibilities of swaying or jackknifing.

It is a general object of the present invention to provide such actuator systems. It is another object to avoid the disadvantages outlined above and provide a relatively inexpensive, compact, dependable, lightweight, easily-installed braking system for house or boat trailers or the like in which the brakes of the trailer are fluid-actuated but are controlled from the tractor.

These and other objects and aspects of the invention will become apparent from the following description of two preferred embodiments in connection with the accompanying drawings in which:

FIGURE 1 is a perspective view of one system embodying the invention illustrated as utilized in a tractor and a trailer that are shown in broken lines;

FIGURE 2 is a diagram illustrating the braking system of FIGURE 1, the parts on the tractor being to the left of the broken line so marked, and the parts on the trailer being to the right of the broken line so marked; and FIGURE 3 is a diagram illustrating another braking system embodying the invention, generally similar to that of FIGURE 2 but embodying means to permit the trailer brakes to be actuated either manually or by tractor brake pedal pressure.

In FIGURES 1 and 2, reference numeral 1 designates the tractor, shown as a passenger automobile, while reference numeral 2 designates the trailer, shown as a two-wheeled house trailer.

All wheels 3 of the tractor have conventional hydraulic brakes 4, each comprising a wheel-mounted brake drum 5, engageable by brakeshoes 6 pivoted at one end of each on the axle assembly of the tractor, a tension spring 7 biasing the other ends of the brakeshoes 6 toward their released position, and a brakeshoe hydraulic cylinder 8 for forcing the upper ends of the shoes 6 apart as the shoes move into braking position. The cylinders in all brakes 4 are connected by hydraulic tubing 9, 10 to a master cylinder 11 having a piston 12 that is conventionally actuated by brake pedal 13 pivotally supported on frame of the automobile and biased to its extended position by compression spring 14. The tractor also has a conventional storage battery 15.

The two trailer wheels 16 have conventional hydraulic brakes 17. Each brake comprises a wheel-mounted brake drum 18 engageable by brakeshoes 19 pivotally mounted on the trailer axle assembly; each brakeshoe is biased toward its released position by tension spring 21 and adapted to be forced into braking position by a brakeshoe cylinder 22. Cylinders 22 for both brakes are actuated by pressure of liquid in tubing 23, 24.

An electrical coupler 25 comprises a coupler part 26 on the tractor that is adapted to couple with a mating coupler part 27 on the trailer. Each of these coupler parts provides the electrically conductive paths necessary for the braking system of the invention, for tail lights, stoplights and inside lights on the trailer (not shown) and to complete the ground connection 28 between battery 15 and the frame of the trailer 2. Each coupler part is flexibly mounted on its supporting vehicle so that both parts will remain coupled even though the relative positions of the vehicles change when they move around curves, over hills and into valleys.

In the apparatus of FIGURES 1 and 2 the tractor 1 carries a hydraulic pressure-actuated electrical switch 30 that includes a contact member 31 mounted on rod 32 of a piston 33 slidably mounted in cylinder 34. A spring 35 in cylinder 34 operates on the rod side of piston 33 to bias contact member 31 to its open position. The blind end of cylinder 34 communicates by tubing 36, 37 with the high pressure side of master cylinder 11.

When in its closed position, contact member 31 completes a circuit including lead 38 between battery 15 and switch 30, lead 39 between switch 30 and the solenoid of a solenoid switch 40, and the ground. Coil 41 of solenoid switch 40 is in such circuit, and when subjected to current causes the contact member 42 of the solenoid armature to connect a lead 43 to the battery 15. Lead 43 extends to coupling member 26. Solenoid switch 40 is a conventional type that is biased to remain open unless energized.

Mounted on tractor 1 is a hydraulic pressure-actuatable variable rheostat 44 comprising a resistance element 45 and a movable contact 46 that is adapted to be moved along the resistance element from an open circuit position shown in full lines, then to a closed circuit position providing maximum resistance, then through an infinite number of positions to a low resistance position shown in broken lines 46'. Contact 46 is shown as moved by a piston rod 47 of a piston 48 slidably mounted in cylinder 49. A compression spring 50 operating in the cylinder on the rod side of the piston biases the movable contact 46 toward its high resistance and open circuit positions. The blind side of the cylinder 49 is connected by tubing 36, 37 to the high pressure side of master cylinder 11.

The variable rheostat 44 thus controls the flow of current in a circuit including lead 51 from battery 15, the conductive portion of resistance 45, and lead 52 that extends to one of the conductors of coupling part 26.

The tractor 2 carries an electric motor 53 that drives a hydraulic fluid power-producing pump 54. Motor 53 shown is a conventional 12 volt D.C. motor that develops maximum torque at a speed of about 1200 to about 8000 r.p.m. Pump 54 directly driven from motor may be a conventional type high r.p.m. gear pump capable of producing liquid pressures of 300–750 lbs. per sq. in. A conventional 3-way modulator valve 55 operated by solenoid 61 is connected to the outlet 56 of pump 54, to tubing 23 that communicates with the brakeshoe cylinders of trailer brakes 17, and to conduit 57 that communicates with a conventional hydraulic accumulator 58 connected through conduit 59 with the inlet of pump 54. The modulator valve is a conventional type normally biased as by spring 62 to close off tubing 23 and to circulate hydraulic liquid from the pump outlet through the bypass including accumulator 58 to the pump inlet; the valve is also infinitely adjustable from a positon permitting full flow of the liquid through the bypass and accumulator, to a position permitting full flow to tubing 23, and to intermediate positions. Modulator valve 55 is adapted to be electrically actuated by solenoid 61, having coil 63, so that the pressure of the liquid in tubing 23, 24 to which the cylinders 22 are subjected is approximately proportional to the electrical current passing through the solenoid coil 63. Motor 53 is connected by lead 64 to lead 43, and also to ground. Coil 63 of solenoid 61 is connected by lead 65 through coupler 25 to lead 52, and also to ground.

The parts of this embodiment are so arranged and connected that, largely by proper selection of springs 35, 50, 7 and 21, when the brake pedal 13 is depressed to apply the brakes of the tractor, the pressure of the liquid in the tractor hydraulic system causes the piston 33 to move first, before any other pistons in the system move, to close the switch 30, thus completing a circuit from the battery 15 through coil 41 of the solenoid switch 40 to ground. This closes switch 40 to complete an electrical circuit that extends from battery 15 through lead 43 and coupled lead 64 to the motor 53 and to ground as shown. The motor then starts, and gets up to a speed sufficient to develop all or most of its maximum torque, while driving the pump 54. Since the solenoid 61 of modulating valve 55 is not yet energized, the valve is in the position to which it is biased to close pump 54 off from tubing 23; liquid pumped by pump 54 at this stage then circulates through conduits 57, 59 and accumulator 58.

Further pressure of the brake pedal 13 causes piston 48 of switch 44 to move against its spring 50 to move the contact 46 of the variable rheostat in the direction that first closes the switch, and then reduces the resistance of the rheostat by an amount related to the pressure in the master cylinder 11. This causes current to flow from battery 15 in a circuit that includes lead 51, a portion of the resistance element 45, lead 52, coupled lead 65, coil 63 of the modulating valve solenoid 61, and the ground. If desired, by suitable selection of parts bearing suitable characteristics, the current in this circuit can be caused to be substantially proportional to the pressure exerted by the brake pedal 13 on the master cylinder 11. Solenoid 61 also can be of a type that opens modulating valve 55 to tubing 23 by an amount proportional to such current, so that hydraulic pressure exerted on brakeshoe cylinders 22 can be substantially proportional to the hydraulic pressure caused by brake pedal 13 in master cylinder 11. If the current in such circuit is not sufficient to cause the valve 55 to open completely to tubing 23, part of the pressure exerted by the pump 55 will be utilized in circulating the liquid through the accumulator. If the pedal pressure is sufficient, valve 55 will open completely to tubing 23 and completely close off the bypass including accumulator 58, so that maximum hydraulic force is applied to the brakeshoe cylinders 22. The braking force exerted by the brakeshoes 19 for any given hydraulic pressure in tubing 23 and 24 depends, of course, on the area of the pistons of cylinders 22 and the areas and types of frictional braking surfaces employed on brakeshoes 19.

When the externally applied pressure on pedal 13 is removed, the spring 14 causes the pedal to return to its extended position and piston 12 of master cylinder 11 to retract, relieving the pressure on the liquid in tubes 9, 10, 36 and 37 so that springs 7 can cause the brakeshoes 6 of the tractor wheel brakes to release. Relief of pressure also causes switch 44 to open, de-energizing solenoid 61 and allowing the modulating valve 55 to move to a position in which it reduces pressure on the liquid in tubing 23 and 24 for trailer brakes 17, allowing springs 21 of these brakes to release them after tractor brakes 4 have been released. Relief of pressure in the master cylinder 11 also causes switch 30 to open, resulting in opening of solenoid switch 40 and de-energizing of motor 53. All brakes are thus fully released and the system is again ready for braking.

It is apparent that only partial reduction of pressure in the master cylinder 11, not so great as to cause switches 30 and 44 to open, will not release the brakes but will merely reduce the braking forces exerted by both the tractor and the trailer brakes.

Preferably, the springs 21 that bias the trailer brakeshoes 19 toward their released positions are weaker than the springs 7 that bias the brakeshoes 6 of the tractor brakes toward their released positions, by an amount sufficient to insure that the brakes of the trailer wheels will engage before the brakes of the tractor wheels, and with greater braking force, and remain engaged longer than the brakes of the tractor wheels.

The motor 53 and the modulating valve 55 thus are in separate electrical circuits. The motor 53 uses substantial current, which may be on the order of 20 to 30 amperes, and the circuit including the motor is controlled by the solenoid switch 40 that may be located either on the tractor or trailer in a position that is safely distant from inflammable liquids such as gasoline, hydraulic fluid, or the like, to eliminate any possible hazards from fire or explosion in the event of sparking at the switch contacts. The switch 40 itself, however, is operated by a switch 30 that controls a circuit carrying a current of considerably less magnitude providing no fire hazard, so switch 30 can be located wherever convenient on the tractor.

In the alternative embodiment of FIGURE 3, in which the trailer brakes can be actuated either by actuation of tractor brake pedal 13 or by a manual control, parts that are identical with those of the previous embodiment have the same reference characters and operate identically with the corresponding parts of the embodiment of FIGURE 2. In the embodiment of FIGURE 3, an electric controller 70 replaces the hydraulic pressure-actuated electrical switch 30 and the pressure actuatable variable rheostat 44 of the embodiment of FIGURE 2. The controller 70 comprises a housing 71, shown in section, that may be mounted at any convenient place on the tractor, such as on or near the dashboard or steering column. Housing 71 encloses an electrical resistor 72 comprising a core 73 formed of suitable electrical insulating material such as fired ceramic or plastic having substantial structural strength. Core 73 has wound thereon a coil 74 of electrical resistance wire the composition of which, and the number of turns and spacing of which can be readily determined for the intended purpose. A shunt member 75, formed of a frame 76 carrying a resilient contact member 77, is pivotally connected at one end thereof to one end of core 73, so that when the unpivoted end of the shunt member 75 is moved toward the resistor the contact member 77 progressively contacts the turns of the coil 74 to decrease the resistance of and increase the flow of electrical current through the resistor. The frame of shunt member 75 has at its pivoted end a bracket portion 78 that is pivotal about a pin 79 fixed in or formed on resistor core 73. At its other end the shunt member is engaged by a compression spring 81 seated in an opening 82 in the other end of core 73 so that the shunt member is biased away from the resistor and, unless moved toward the resistor, does not make electrical contact with the resistor coil 74.

The shunt member is moved toward the coil to contact the coil 74 and to decrease the resistance thereof by lever 83, one end of which is pivotally mounted at 84 in an end of housing 71 and the other end of which projects from the housing and carries a handle 85. Lever 83 rigidly carries a pusher member 86 that bears against the lower side of frame 76 of shunt member 75 and has an upper lug 87 slidably projecting into a slot 88 in frame 76, and that has a lower lug 89 that slidably projects into a slot 90 in the bottom wall of housing 71. These lugs aid in guiding lever 83 and shunt member 75 in their movements toward and away from resistor 72.

Lever 83 may be moved to a variety of positions toward the resistor 72, one of which is shown by the broken lines 83', either manually or by operation of a piston 91 of a cylinder 92 fixed to the bottom of housing 71, and connected by tubing 37 to master cylinder 11 of the tractor braking system. Consequently, when pressure is exerted on the brake pedal 13 lever 83 and shunt member 75 are automatically moved by piston 91 by an amount related to the pressure, thus increasing the flow of current through the coil 74 of the resistor by an amount that increases with an increase in pressure.

The controller 70 also includes a switch 93 that operates to close a circuit between battery 15 and motor 53 on the trailer before any current can pass through the coil 74 of the resistor 72. Such means includes a relatively stiff contact member 94 fixed to resistor insulating core 73 at its end adjacent the unpivoted end of shunt member 75. A relatively resilient contact member 95 is mounted in electrically conductive relation on the unpivoted end of the frame 76 of the shunt member 75, with its upper free end spaced from the lower free end of contact member 94. The shapes and locations of the ends of these contact members are such that slight rocking movement of the shunt member 75 toward the resistor 72 will close the circuit controlled by switch 93 before any appreciable current, if any, can flow through resistor coil 74, and so the switch 93 remains closed in good electrical contact while contact member 77 of the shunt member 75 is in contact with any portion of coil 74.

A lead 38 electrically connects the frame 76 of the shunt member 75, and hence contact member 95 of switch 93, to battery 15. A lead 39 connects the contact 94 of switch 93 to the coil 41 of a normally open solenoid switch 40 having a contact member 42 that, when moved to its closed position upon solenoid energization, completes a circuit from battery 15 through lead 43 to motor 53.

The coil 74 of resistor 72 is connected, at its end last contacted by the shunt member, by lead 52 to the coil 63 of solenoid 61 that controls modulating valve 55; the other end of coil 74 is unconnected.

The parts of this embodiment are so connected that when the brake pedal 13 of the tractor is depressed to apply the tractor brakes, the pressure of the liquid in the tractor hydraulic system causes piston 91 of cylinder 92 to move and raise lever 83 so that it rocks shunt member 75 about its pivot 79 so it moves toward coil 74. Initial movement closes switch 93, preferably before shunt contact member 77 contacts the coil, thus completing the circuit from the battery 15 through coil 41 of the solenoid switch 40 to the ground, so switch 40 closes to complete another electrical circuit that extends from battery 15 through lead 43 and coupled lead 64 to the motor 53 and to ground as shown. The motor then starts, and gets up to a speed sufficient to develop all or most of its maximum torque, while driving the pump 54. Since the solenoid 61 of modulating valve 55 is not yet energized, the valve is in the position to which it is biased by its spring 62 to close pump 54 off from tubing 23 communicating through tubing 24 with the hydraulic cylinders 22 that actuate the brakeshoes 19 of the brakes 17 of the tractor wheels 16; all the liquid pumped by pump 54 at this stage then circulates, as in the previous embodiment, through conduits 57, 59 and accumulator 58.

Further pressure of brake pedal 13 causes piston 91 of controller 70 to extend further, thus raising the lever 83 still higher and causing contact member 77 of the shunt member 75 progressively to contact the turns of the resistor coil 74 from its unconnected end toward its connected end. This completes a circuit from the battery 15 through lead 38, the movable contact member 77, a portion of coil 74, lead 52, coupled lead 65, to the coil 63 of the solenoid 61 controlling modulating valve 55. As the fluid pressure on the brake pedal 13 and on the piston 91 increases, member 77 of the shunt member progressively contacts the turns of the coil 74 and the current passing through such circuit increases. If the current in such circuit is not sufficient to cause valve 55 to open completely to tubing 23, part of the pressure exerted by the pump 55 will be utilized in circulating the liquid through the accumulator. If the pedal pressure is sufficient, valve 55 will open completely to tubing 23 and completely close off the by-pass including accumulator 58, so that the maximum hydraulic force permitted by the magnitude of the current is supplied to the brakeshoe cylinders 22.

When the externally applied pressure on pedal 13 is removed, the spring 14 causes the pedal to return to its extended position and the piston 12 of master cylinder 11 to retract, relieving the pressure on the liquid in tubes 9, 10 and 37. Springs 7 cause the brakeshoes 6 of the tractor wheel brakes to release. Relief of pressure also causes the piston 91 to retract, aided by the biasing force of gravity on the lever 83; this causes shunt member 75 to move away from coil 74 under the influence of its spring 81, resulting in an increase of resistance and reduction of current in the circuit to the solenoid coil 63, so that the modulating valve 55 moves to a position in which it reduces pressure on the liquid in tubing 23 and 24 sufficiently to allow springs 21 to release trailer brakes 17 after the tractor brakes 4 have been released. Relief of pressure in the master cylinder 11 also causes switch 93 to open, resulting in the opening of the solenoid switch 40 and de-energizing of motor 53. All brakes are thus fully released and the system is again ready for braking.

It is apparent that, as in the previous embodiment, only partial reduction of pressure in the master cylinder 11, not so great as to cause the contact member 77 to leave coil 74 nor to cause switch 93 to open, will not release the brakes but will merely reduce the braking forces exerted by both the tractor and the trailer brakes.

As in the previous embodiment, the springs 21 that bias trailer brakeshoes 19 preferably are weaker than the springs 7 that bias the brakeshoes 6 of the tractor brakes by an amount sufficient to insure that the brakes of the trailer wheels 16 will engage before the brakes of the tractor wheels 4 and with greater braking force and remain engaged longer than the brakes of the tractor wheels.

It is apparent that, even without movement of the tractor brake pedal 13, the trailer brakes 17 only can be actuated by hand movement of lever 83 upwardly, such movement first closing the switch 93 that starts the motor 53, and then closing the circuit including the coil 63 of the solenoid 61 that controls the modulating valve 65 and progressively increasing the current in such circuit to control the amount by which the modulating valve opens to the tubing 23 and 24. The distance by which lever 83 is raised will determine the braking force applied to the trailer wheels.

This feature is advantageous because under some circumstances it may be desired to apply a controllable amount of braking force to the trailer wheels only, as to reduce swaying of the trailer.

In the embodiment of FIGURE 3, moreover, the lead 52 has in series therein a manually adjustable rheostat 96 permitting occasional adjustment, if desired, of the resistance in circuit 52 to control the current passing through the coil 63 of solenoid 61. By this means the braking pressure exerted by the trailer brakes, and particularly the maximum pressure thereof, can be adjusted. The rheostat 96 may be conveniently located on the tractor. Such rheostat could, of course, be also used in the system shown in FIGURE 2.

In the embodiment of FIGURE 3, it is preferable to control a stoplight for indicating when the trailer brakes are applied, by a circuit including switch 93. The stoplight will then be operated when the trailer brakes are actuated either by movement of brake pedal 13 or by hand movement of lever 83 without touching brake pedal 13. Of course, in either embodiment, a stoplight may be actuated by other means, such as by conventional switch means responsive to movement of the tractor brake pedal.

In each embodiment there is, it is apparent, a time-delay means that gives motor 53 sufficient time in which to start up and achieve speed before it is called upon to deliver sufficient torque for driving pump 54 under load to produce sufficient hydraulic pressure to actuate the trailer wheel brakes. The motor, therefore, can be much smaller and considerably less expensive than would be the case if it was called upon to start up under high torque. Such a motor, moreover, need require a time-delay of only a fraction of a second to reach the desired speed.

For this reason, as well as because of the other features of the invention, it is possible to provide an inexpensive, compact and dependable, light-weight and easily installed braking system for house trailers or the like in which the brakes are hydraulically actuated but electrically controlled from the tractor. It is also apparent that the present invention makes possible the trailer-braking system that is safe from the standpoint of firehazard and dependable from the standpoint of braking.

While the hydraulic system disclosed utilises conventional hydraulic liquids as the power fluid, it is apparent that other suitable fluids may be used. It is also apparent that features of the braking systems disclosed may be utilized for purposes other than those disclosed.

Those skilled in the art will appreciate that various modifications other than those indicated can be made in the illustrated embodiments of the invention without departing from the spirit of the invention. It is intended that the patent shall cover, by suitable expression in the appended claims, whatever features of patentable novelty reside in the invention. The terms and expressions that have been employed are used as terms of description and not of limitation, and there is no intention of excluding such equivalents of the invention described or of the portions thereof as fall within the purview of the claims.

What is claimed is:

1. An actuator system comprising actuatable means adapted to be actuated by pressure of fluid; conduit means connected to said actuatable means and adapted to contain fluid for actuating said actuatable means; means for developing fluid pressure; power means for driving said fluid pressure-developing means; fluid pressure-regulating means for controlling variably the fluid pressure developed by said fluid pressure-developing means and transmitted to the fluid in said conduit means; means, including a first fluid pressure-controlled electric switch, for initiating starting and causing stopping of said power means; means, including a second fluid pressure-controlled electric switch, for controlling operation of said pressure-regulating means so that substantial pressure developed by said pressure-developing means is transmitted to the fluid in said conduit means only after sufficient time has elapsed to permit said power means to develop sufficient power to cause said pressure-developing means to develop sufficient fluid pressure to actuate said actuatable means; and fluid pressure means for controlling both of said pressure-controlled switches.

2. A system according to claim 1 in which said means for developing fluid pressure is a pump.

3. A system according to claim 1 in which said fluid pressure-regulating means is a modulator valve.

4. A system according to claim 1 in which said fluid pressure-regulating means is a modulator valve that is controllable to provide a wide variety of pressures in said conduit means from the pressure developed by said fluid pressure-developing means, which modulator valve is controlled to positions within said range of positions by a variable rheostat controlled by said second fluid pressure-controlled electric switch.

5. A system according to claim 4 in which said means for developing fluid pressure is a pump driven by said motor the operation of which is controlled by said first fluid pressure-controlled electric switch.

6. A remotely controlled actuator system comprising actuatable means adapted to be actuated by the pressure of fluid, conduit means connected to said actuatable means and adapted to contain fluid for actuating said actuatable means, means for developing fluid pressure, power means for driving said fluid pressure-developing means, electrically actuatable fluid pressure-regulating means for controlling the amount of fluid pressure developed by said fluid pressure-developing means that is transmitted to the fluid in said conduit means, remotely located means connected to said power means by first electrical circuit means for initiating starting and causing stopping of said power means when said first electrical circuit means is energized and de-energized; means connected to said pressure-regulating means by second electrical circuit means for controlling operation of said pressure-regulating means so that pressure developed by said pressure-developing means is transmitted to the fluid in said conduit means when said second electrical circuit means is suitably energized; and means for so energizing said second electrical circuit means only after sufficient time has elapsed after said first electrical circuit means is energized to start said power means to permit said power means to develop sufficient power to cause said pressure-developing means to develop sufficient pressure that when transmitted to said fluid in said conduit will actuate said actuatable means.

7. A system according to claim 6 in which said means for initiating starting and causing stopping of said motor and said means for controlling operation of said pressure-regulating means are both operable by fluid pressure means, both said means being operatively connected to cause said first and second circuit means to be sequentially energized to cause said sufficient pressure to be transmitted to the fluid in said conduit means only after the elapse of time as set forth in claim 6.

8. A system as in claim 6 in which said means for initiating starting and causing stopping of said motor and said means for controlling operation of said pressure-regulating means are both manually operable, both said means being operatively connected to cause said first and second circuit means to be sequentially energized to cause said sufficient pressure to be transmitted to the fluid in said conduit means only after the elapse of time as set forth in claim 6.

9. A system according to claim 6 comprising means for adjusting the resistance of said second circuit means.

10. A system according to claim 6 in which said means for controlling operation of said pressure-regulating means includes a variable resistance in said second circuit means.

11. A system according to claim 6 in which said means for controlling operation of said pressure regulating means includes a first variable resistance and a second independently adjustable variable resistance, both in said second circuit means.

12. In a tractor-trailer braking system, brakes on said trailer adapted to be actuated by pressure of fluid, conduit means on said trailer connected to said brakes and adapted to contain fluid for actuating said brakes; a pump on said trailer for generating fluid pressure; a motor on said trailer for driving said pump; fluid pressure-regulating means on said trailer for controlling variably the fluid pressure developed by said pump and transmitted to the fluid in said conduit means; means on said tractor, including a first fluid pressure-controlled switch, for initiating starting and causing stopping of said motor; means, including a second fluid pressure-controlled electric switch, for controlling operation of said pressure-regulating means so that substantial pressure developed by said pressure-developing means is transmitted to the fluid in said conduit means only after sufficient time has elapsed to permit said motor to achieve a speed such that it can drive said pump to enable it to develop sufficient pressure to actuate said brakes; and fluid pressure means for controlling both of said pressure-controlled switches.

13. The brake system according to claim 12 in which said fluid pressure-regulating means is a modulator valve that is controllable to provide a wide variety of pressures in said conduit means from the pressure developed by said fluid pressure-developing means, which modulator valve is controlled to positions within said range of positions by a variable rheostat controlled by said second fluid pressure-controlled electric switch.

14. In a tractor-trailer braking system, brakes on said trailer adapted to be actuated by pressure of fluid, conduit means on said trailer connected to said brakes and adapted to contain fluid for actuating said brakes, a pump on said trailer for generating fluid pressure, an electric motor on said trailer for driving said pump, electrically actuatable fluid pressure-regulating means on said trailer for controlling the pressure developed by said pump and transmitted to the fluid in said conduit means, means on said tractor connected to said motor by first electrical circuit means for initiating starting and causing stopping of said motor when said first electrical circuit means is energized and de-energized, means connected to said pressure-regulating means by second electrical circuit means operating to control said pressure-regulating means so that pressure developed by said pressure-developing means is transmitted to the fluid in said conduit means when said second electrical circuit means is suitably energized, and means for so energizing said second circuit means only after sufficient time has elapsed after said first circuit means is energized to start said motor, to permit said motor to achieve a speed such that it can drive said pump to enable it to develop sufficient pressure to actuate said brakes.

15. A system according to claim 14 in which said means for initiating starting and causing stopping of said motor and said means for controlling operation of said pressure-regulating means are both operable by fluid pressure means, both said means being operatively connected to cause said first and second circuit means to be sequentially energized to cause said sufficient pressure to be transmitted to the fluid in said conduit means only after the elapse of time as set forth in claim 14.

16. A system as in claim 14 in which said means for initiating starting and causing stopping of said motor and said means for controlling operation of said pressure-regulating means for both manually operable, both said means being operatively connected to cause said first and second circuit means to be sequentially energized to cause said sufficient pressure to be transmitted to the fluid in said conduit means only after the elapse of time as set forth in claim 14.

References Cited
UNITED STATES PATENTS

| | | | |
|---|---|---|---|
| 1,921,590 | 8/1933 | Staude | 60—52 |
| 2,083,740 | 6/1937 | Paullin | 230—24 X |
| 2,330,739 | 9/1943 | Piron | 303—20 X |
| 2,818,943 | 1/1958 | Coward | 60—52 X |
| 3,080,718 | 3/1963 | Clary | 60—52 |

EUGENE G. BOTZ, *Primary Examiner.*